United States Patent [19]

Kotschy et al.

[11] 4,142,222

[45] Feb. 27, 1979

[54] REGENERABLE ELECTRIC CAPACITOR

[75] Inventors: Josef Kotschy, Unterhaching; Walter Voelkl, Munich, both of Fed. Rep. of Germany

[73] Assignee: Siemens Aktiengesellschaft, Berlin & Munich, Fed. Rep. of Germany

[21] Appl. No.: 794,084

[22] Filed: May 5, 1977

[30] Foreign Application Priority Data

May 25, 1976 [DE] Fed. Rep. of Germany ....... 2623474

[51] Int. Cl.$^2$ ............................................ H01G 1/017
[52] U.S. Cl. ..................................... 361/273; 361/304
[58] Field of Search ................................ 361/273, 304

[56] References Cited

U.S. PATENT DOCUMENTS

| 2,935,418 | 5/1960 | Berthold | 264/22 X |
| 3,012,176 | 12/1961 | Williams | 361/304 X |
| 3,450,968 | 6/1969 | Cox | 361/323 X |

FOREIGN PATENT DOCUMENTS

| 1439179 | 11/1968 | Fed. Rep. of Germany | 361/273 |
| 4414982 | 12/1966 | Japan | 361/273 |
| 666731 | 2/1952 | United Kingdom | 361/273 |

*Primary Examiner*—E. A. Goldberg
*Attorney, Agent, or Firm*—Hill, Gross, Simpson, Van Santen, Steadman, Chiara & Simpson

[57] ABSTRACT

A capacitor for AC voltage applications consists of staggered wound layers of synthetic material films metallized on both sides. The metallizations are carried out on the two sides of the films with differing thicknesses, wherein at least the greater thickness metallization is contacted by means of Schoop layers. The exposed edges on the two sides of the films are provided with different widths, wherein the difference corresponds with a staggering of the films during winding.

3 Claims, 2 Drawing Figures

REGENERABLE ELECTRIC CAPACITOR

BACKGROUND OF THE INVENTION

1. Field of the Invention

The invention relates to a regenerable, electric capacitor, in particular for A.C. voltages, which consists of wound-on layers of synthetic films which are provided on both sides with a metallization, wherein exposed edges on the two sides of the film surfaces are arranged in opposing fashion, and wherein the outer contact elements are secured to end-side contact layers.

2. Description of the Prior Art

Capacitors of this type are known from the German AS No. 1 093 162. These capacitors are difficult to contact to since during winding, virtually no joints are formed at the end sides, and therefore the contacting is inadequate both mechanically and electrically.

Furthermore, regenerable electric capacitors are known which consist of wound-on layers of synthetic films metallized on one side. These capacitors have capacitance values which decrease in continuous operation, due to the increased edge field strength at pores in the metallizations which results in oxidation in the direction leading from the pores, such oxidation causing the capacitance to decrease. In order to at least partially reduce this undesired effect, the aforesaid capacitors can be subjected to a treatment which consists in vacuum-drying and in subsequent epoxide resin casting. Such a treatment is expensive, however.

SUMMARY OF THE INVENTION

An object of the invention is to provide a capacitor which is characterized by a long life duration and inexpensive production.

This object is realized, in accordance with the invention, in that the synthetic films are wound on with an offset x, and that the exposed edges have different widths on the two sides of the insulating film surfaces.

DESCRIPTION OF THE PREFERRED EMBODIMENTS

Figure 1:
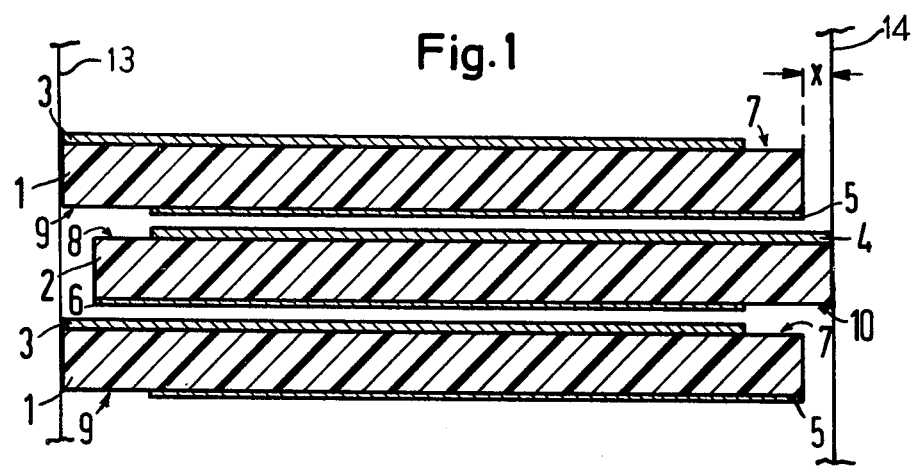
FIG. 1 is a side view illustrating the construction of the capacitor of this invention.

FIG. 1 illustrates the construction of the capacitor of this invention composed of two polypropylene films 1 and 2. For clarity, a second layer of the polypropylene film 1 has also been shown. The synthetic films 1 and 2 are provided with metallizations 3, 4 on their top sides and with metallizations 5, 6 on their under sides. As can be seen from FIG. 1, the metallizations 3 and 4 are thicker (conductance of 0.1 to 0.5 mhos) than the metallizations 5, 6 (conductance of 0.05 to 0.25 mhos). At least the metallizations 3 and 4 are connected to end-side contact layers 13 and 14 in FIG. 1, and to which the outer contact elements are secured in the form of connection wires or the like. Expediently, these metallizations 3, 4 are arranged on a glow-treated side of the films.

The synthetic films 1 and 2 are wound on offset from one another by the spacing x, as a result of which the requisite joints needed to secure to Schoop material are formed at the end sides.

The function of the thinner metallizations 5 and 6 consists in eliminating the high edge field strength at the location of pores of the metallizations 3 and 4. In order to ensure that the capacitor is regenerable, the metallizations 3 and 4 must in fact be appropriately thin. As a result, pores are almost always present in these metallizations.

As mentioned in the introduction, the coating becomes destroyed by the increased edge field strength starting from the pores, as a result of which the capacitance of the capacitors continuously reduces during operation. The thin opposite metallizations 5 and 6 prevent this destruction by the production of a homogeneous field as it is virtually impossible for two pores to happen to lie one above another. This results in the advantage that with a given voltage, it is possible to use thinner foils, as the homogeneous field in the capacitor permits higher field strength.

The metallizations 3 and 4 of the synthetic films 1 and 2 are designed in such a way that the exposed edges 7 and 8 are narrower than the free edges 9 and 10 on those sides of the foil which have the thinner metallizations 5 and 6. Preferably, the difference in the width of the free edges corresponds to the winding offset x. In this way it is ensured that the metallizations 4, 5 and 3, 6 are arranged one above another, in coincidence, inside the capacitor. This is preferable since otherwise a single-layer metallization projects at the inner edges, and as a result oxidation leads to a rapid reduction in capacitance.

The thickness of the metallizations 3 and 4 should be selected to be such that it is possible to establish a good contact with the end-side Schoop layers. However, it is also possible, with a view to achieving a good regenerability, to provide the metallizations 3 and 4 thinner together with an edge reinforcement in the edge zones which are to be contacted.

The sum of the conductances of the metallizations 3, 5 and 4, 6 is selected to be such that an adequate regenerability is ensured.

Figure 2:
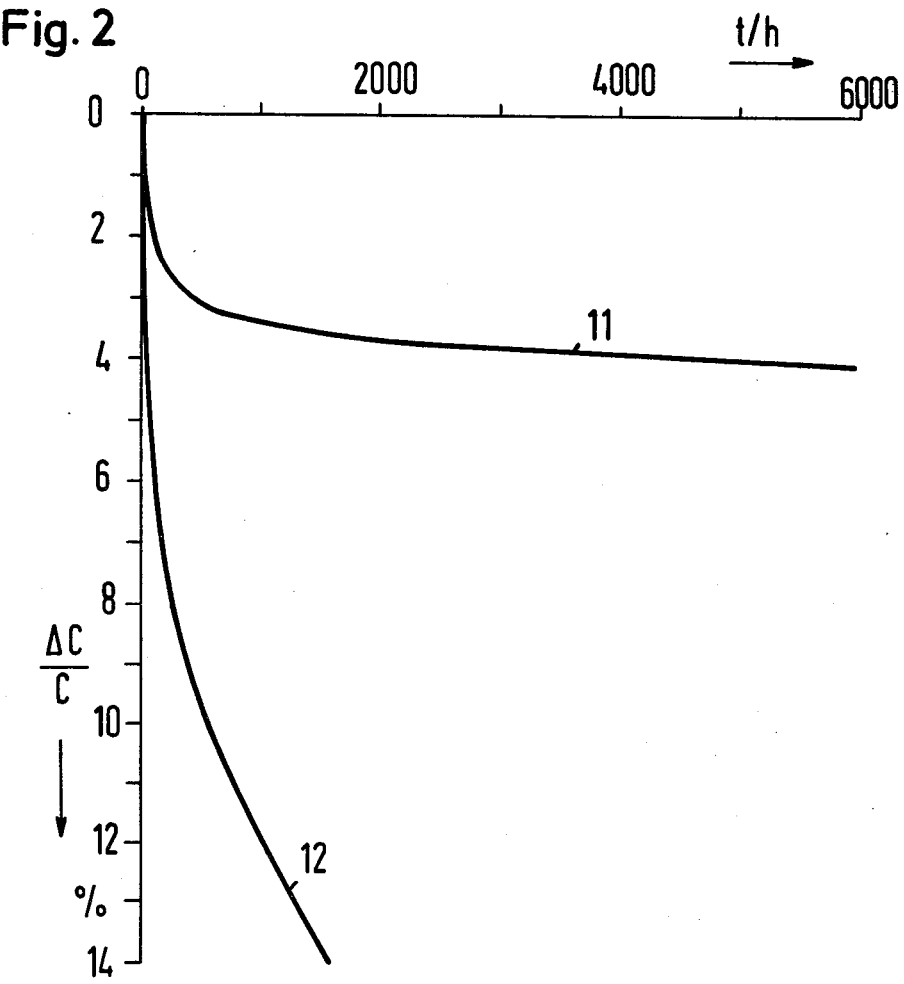
FIG. 2 illustrates a graph of an endurance test comparison between capacitors corresponding to the invention and conventional capacitors, without vacuum-drying and without epoxide resin casting.

FIG. 2 illustrates endurance tests carried out on capacitors corresponding to the invention with 8 $\mu$m thick polypropylene films 1 and 2. The metallizations 3, 4 and 5, 6 consist of aluminum, and the conductance of the metallizations 3 and 4 amounts to 0.3 mhos whereas the conductance of the metallizations 5, 6 amounts to 0.15 mhos. The offset x during winding amounts to 1 mm, and the free edges 7, 8 possess a width of 2 mm whereas the free edges 9, 10 possess a width of 3 mm.

In FIG. 2 the reduction in capacitance $\Delta$ C/C is illustrated in dependence upon the operating time t per hour h at an environmental temperature of 70° C. and a connected voltage of 380V. The experiments were carried out on capacitors which were unprotected — thus were not cast in epoxide resin — and which were neither tempered nor vacuum-dried. The curve 11 was measured on capacitors having the construction corresponding to the invention, whereas the curve 12 relates to conventional capacitors (capacitors metallized on one side). The superiority of the capacitor in accordance with the invention is directly illustrated from FIG. 2 and it should also be borne in mind that the initial drop in capacitance in curve 11 is mainly caused by shrinkage, which may be eliminated by tempering.

Although various minor modifications may be suggested by those versed in the art, it should be understood that we wish to embody within the scope of the patent warranted hereon, all such embodiments as reasonably and properly come within the scope of our contribution to the art.

We claim as our invention:

1. A regenerable AC electric capacitor which comprises wound-on layers of synthetic films provided on both sides with a metallization in direct layer contact with the synthetic films, exposed edge regions of the films not covered by metallization being arranged at opposite edges, one region on each of the two sides of the film, end-side contact layers connecting with the metallizations, said synthetic films being wound on with adjacent films being laterally offset with respect to one another and that the exposed edge regions on the two sides of the film surfaces have differing widths, the metallization on one side having a conductance substantially different than the metallization on the other side of the synthetic films, the metallizations comprising aluminum and the synthetic films polypropylene, and the metallizations of higher conductances being connected to said end-side contact layers and the metallizations of lower conductances are not directly connected to said end-side contact layers.

2. An electric capacitor as claimed in claim 1, characterized in that the sides of the films which are provided with less conductive metallizations have wider exposed edge regions than sides of the films with higher conductive metallizations.

3. An electric capacitor as claimed in claim 1, characterized in that the difference between the widths of the exposed edge regions corresponds to the lateral offset of the adjacent films.

* * * * *